United States Patent
Marshall et al.

(10) Patent No.: US 12,298,652 B2
(45) Date of Patent: May 13, 2025

(54) DEVICE MOUNTING BRACKETS

(71) Applicant: Cloud Cap Technology, Inc., Hood River, OR (US)

(72) Inventors: Travis H. Marshall, West Hartford, CT (US); Brian J. Smith, Maynard, MA (US); Ryan Ernst, Hood River, OR (US); Nitin Chandola, Fort Walton Beach, FL (US)

(73) Assignee: CLOUD CAP TECHNOLOGY, INC., Hood River, OR (US)

( * ) Notice: Subject to any disclaimer, the term of this patent is extended or adjusted under 35 U.S.C. 154(b) by 21 days.

(21) Appl. No.: 18/132,582

(22) Filed: Apr. 10, 2023

(65) Prior Publication Data

US 2024/0337911 A1 Oct. 10, 2024

(51) Int. Cl.
*G03B 17/56* (2021.01)
*F16B 2/22* (2006.01)

(52) U.S. Cl.
CPC .............. *G03B 17/561* (2013.01); *F16B 2/22* (2013.01)

(58) Field of Classification Search
CPC ................................ G03B 17/561; F16B 2/22
USPC ...................................................... 248/316.7
See application file for complete search history.

(56) References Cited

U.S. PATENT DOCUMENTS

| | | | | |
|---|---|---|---|---|
| 4,341,452 A | * | 7/1982 | Korling | F16M 11/105 396/428 |
| 7,440,027 B2 | * | 10/2008 | Weaver | F16M 13/027 348/375 |
| 9,413,930 B2 | | 8/2016 | Geerds | |
| 2012/0273641 A1 | * | 11/2012 | Gorman | E06B 9/02 248/316.7 |
| 2017/0314732 A1 | * | 11/2017 | Minn | B60R 11/02 |
| 2018/0198968 A1 | * | 7/2018 | Heine | H04N 23/50 |
| 2019/0281973 A1 | * | 9/2019 | Coates | F16B 5/123 |
| 2020/0059583 A1 | * | 2/2020 | Tamura | H04N 23/54 |
| 2022/0100061 A1 | | 3/2022 | Berst et al. | |
| 2023/0194047 A1 | * | 6/2023 | Unice | G02B 23/16 248/278.1 |
| 2023/0196620 A1 | * | 6/2023 | Zhang | G01B 11/2755 348/135 |
| 2023/0199316 A1 | * | 6/2023 | Tulsi | F16M 11/041 396/428 |
| 2023/0275530 A1 | * | 8/2023 | Chen | G03B 17/561 310/323.02 |
| 2024/0118592 A1 | * | 4/2024 | Liu | F16M 13/022 |

* cited by examiner

*Primary Examiner* — Muhammad Ijaz
(74) *Attorney, Agent, or Firm* — CANTOR COLBURN LLP

(57) ABSTRACT

A mounting bracket configured to receive a device to mount the device can include a first portion extending in an axial direction and configured to mount to a first side of the device, a second portion extending in the axial direction and configured to mount to a second side of the device, and a crossbar structure connecting the first portion to the second portion. The crossbar structure can extend between the first portion and the second portion in a transverse direction to the axial direction. The crossbar structure can be configured to flex to allow the first portion and the second portion to move laterally apart to allow insertion of the device between the first portion and the second portion and snap fit of the device between the first portion and the second portion.

19 Claims, 11 Drawing Sheets

DEVICE MOUNTING BRACKETS

FIELD

This disclosure relates to mounting brackets for devices (e.g., cameras).

BACKGROUND

Traditional camera brackets using traditional manufacturing processes need to be assembled in multiple small parts in order to be assembled on the camera. This leads to excess weight due to overlapping flanges and loose hardware required to bolt up those flanges. Assembling the cameras in this fashion can be time consuming due to the nature of the small parts. Also, traditional manufacturing processes for camera brackets, e.g., sheet metal fabrication and machining, can require excess material for forming to prevent distortion and scrapping parts, leading to excess material in the final design due to manufacturing. Such processes can require bolted flanges and overlapping material for assembly.

Such conventional methods and systems have generally been considered satisfactory for their intended purpose. However, there is still a need in the art for improvements. The present disclosure provides a solution for this need.

SUMMARY

A mounting bracket configured to receive a device to mount the device can include a first portion extending in an axial direction and configured to mount to a first side of the device, a second portion extending in the axial direction and configured to mount to a second side of the device, and a crossbar structure connecting the first portion to the second portion. The crossbar structure can extend between the first portion and the second portion in a transverse direction to the axial direction. The crossbar structure can be configured to flex to allow the first portion and the second portion to move laterally apart to allow insertion of the device between the first portion and the second portion and snap fit of the device between the first portion and the second portion.

The crossbar structure can include an angled flex member that extends between and connects to a first corner and a diagonally opposite second corner. The angled flex member can be angled 45 degrees, for example. The crossbar structure can be defined in a crossbar plane perpendicular to the axial direction. The first portion and the second portion can extend approximately 90 degrees from the crossbar plane, for example.

The first portion and second portion can include one or more snap fit features configured to retain the mounting bracket to the device in a snap fit relationship. The one or more snap fit features include one or more holes configured to mate with one or more pins on an exterior of the device.

The crossbar structure can include one or more mounting holes defined therein to receive a circuit board. In certain embodiments, the crossbar structure is configured to be a backstop for the device. In certain embodiments, the device can be an imaging device.

In certain embodiments, the first portion, the second portion, and the crossbar structure are a single piece. In certain embodiments, the first portion, the second portion, and the crossbar structure form a skeletal body having a plurality of openings configured to minimize weight.

In accordance with at least one aspect of this disclosure, a method of using the mounting bracket, e.g., as disclosed herein, e.g., as described above, can include outwardly moving the first portion and the second portion causing a flexing of the crossbar structure, inserting the device into the mounting bracket while the first portion and the second portion are moved outwardly, and releasing the first portion and the second portion to snap around the device. In certain embodiments, releasing the first portion and the second portion includes snap fitting one or more snap fit features of the first portion and the second portion to retain the mounting bracket to the device in a snap fit relationship.

The method can include mounting the first portion and the second portion to the device with one or more fasteners. For example, the one or more fasteners can include one or more screws. The method can include attaching a circuit board to the crossbar structure.

In accordance with at least one aspect of this disclosure, a method for manufacturing the mounting bracket, e.g., as disclosed herein, e.g., as described above, can include additively manufacturing the mounting bracket. Additively manufacturing can include building the mounting bracket at an angle relative to the axial direction. For example, building the mounting bracket at an angle relative to the axial direction can include building the mounting bracket at a 45 degree angle relative to the axial direction.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
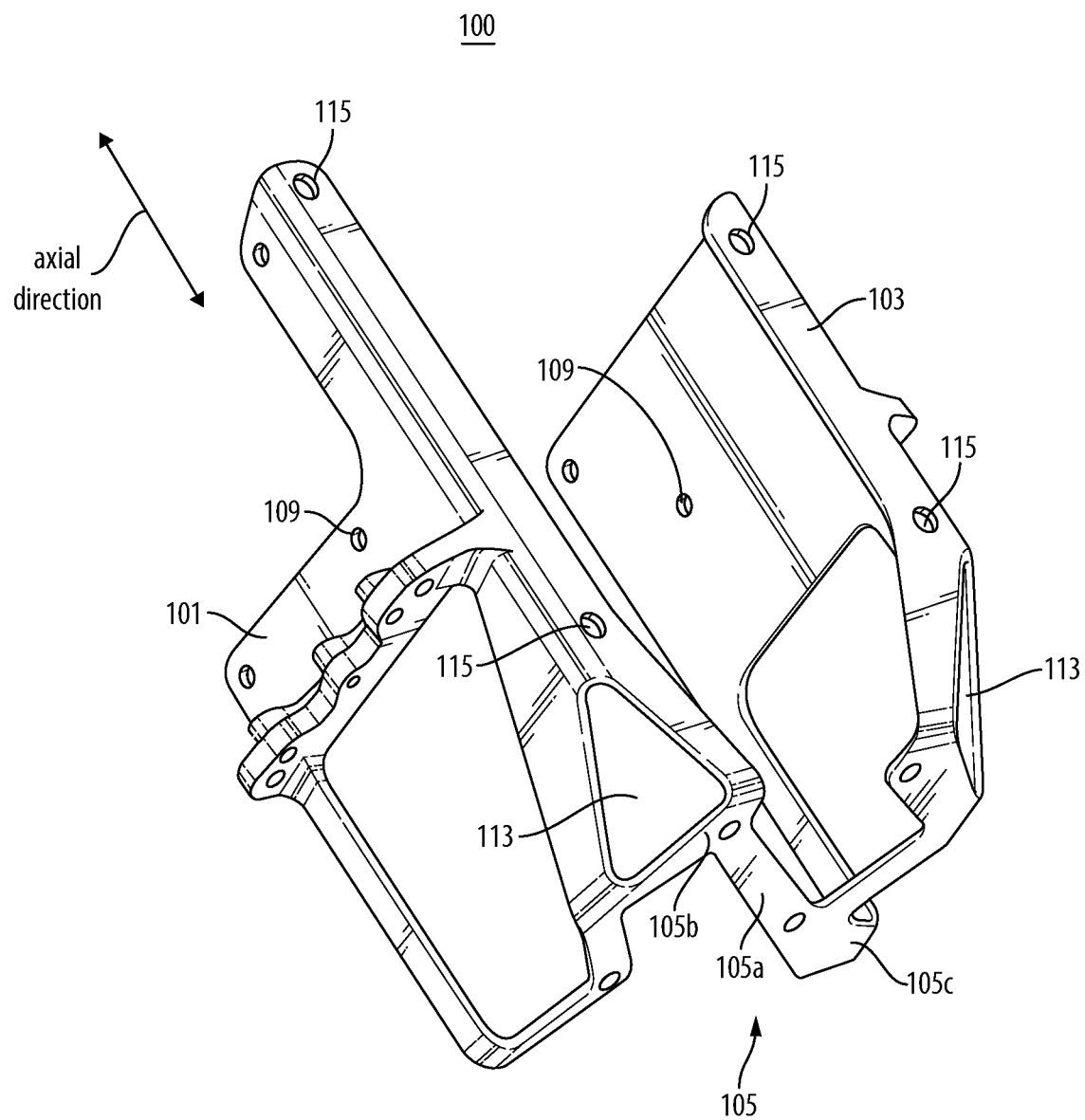
FIG. 1A is a perspective view of an embodiment of a mounting bracket in accordance with this disclosure.

Reference will now be made to the drawings wherein like reference numerals identify similar structural features or aspects of the subject disclosure. For purposes of explanation and illustration, and not limitation, an illustrative view of an embodiment of a mounting bracket in accordance with the disclosure is shown in FIGS. 1A and 1s designated generally by reference character 100. Other embodiments and/or aspects of this disclosure are shown in FIGS. 1B-3. Certain embodiments described herein can be used to mount a camera to an aircraft (e.g., a drone aircraft), or for any other suitable use.

Figure 1B:
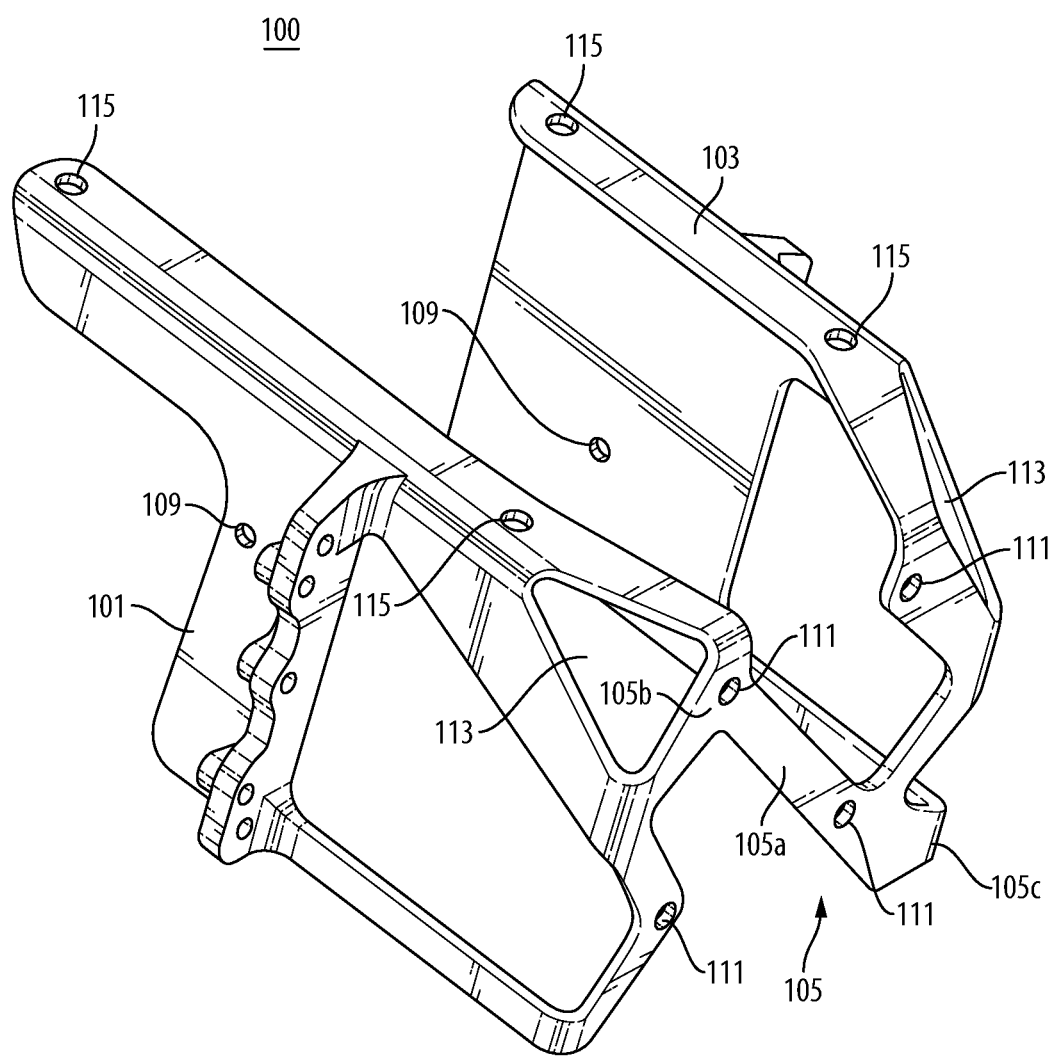
FIG. 1B is another perspective view of the embodiment of FIG. 1A.
Figure 1C:
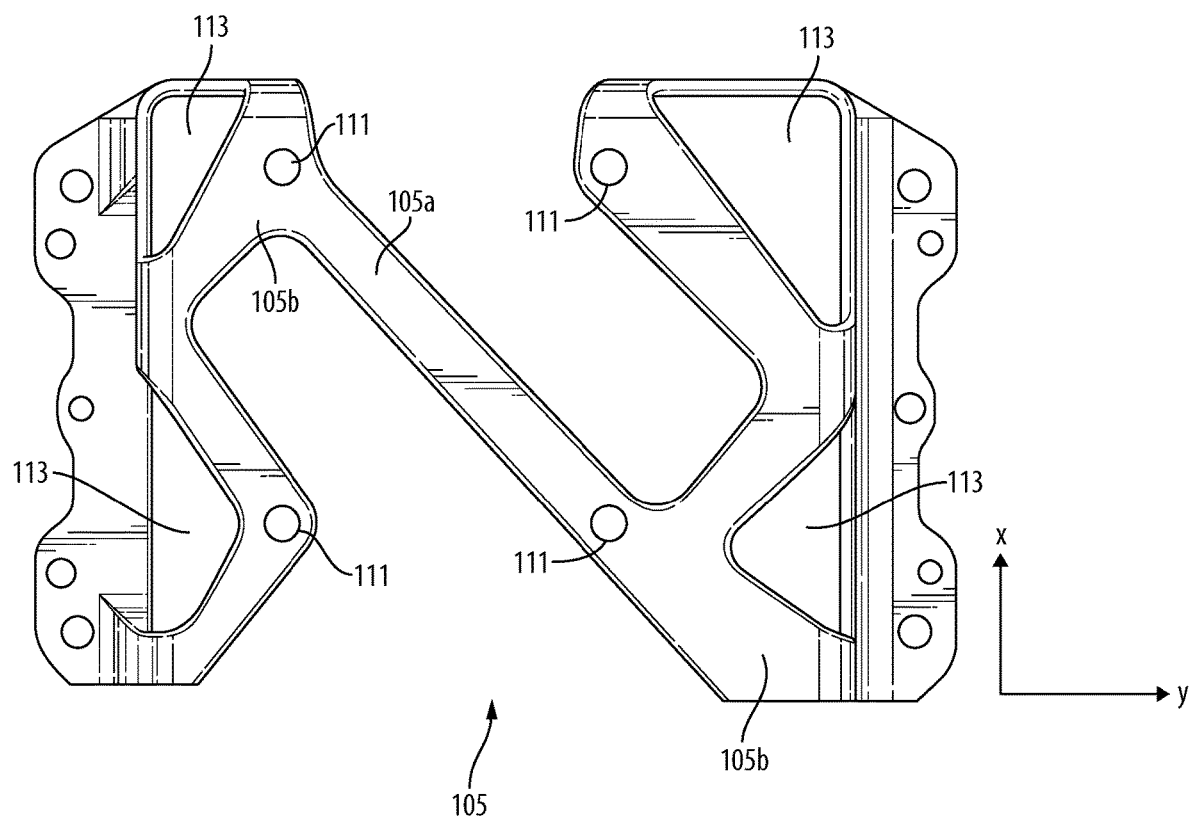
FIG. 1C is a rear elevation view of the embodiment of FIG. 1A.
Figure 1D:
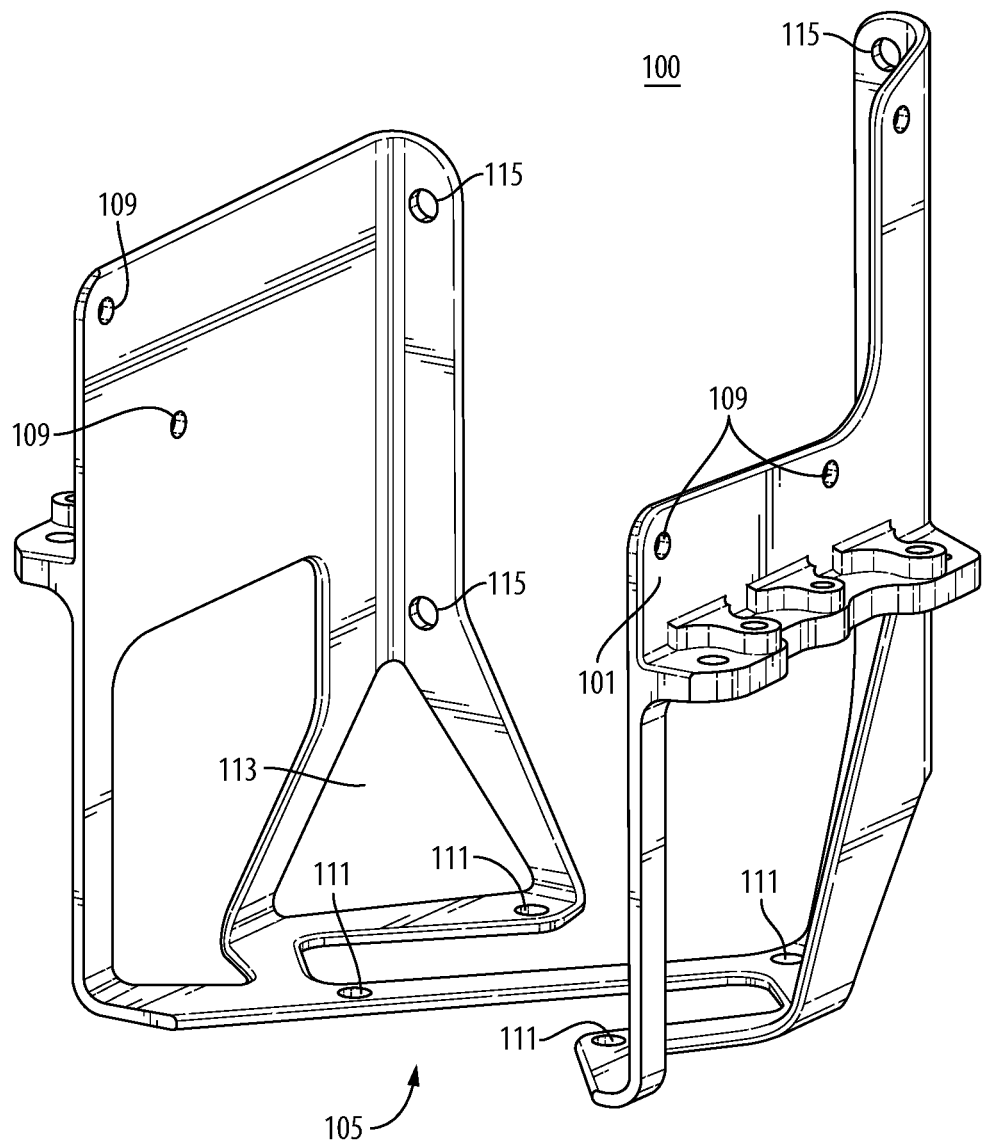
FIG. 1D is a bottom perspective view of the embodiment of FIG. 1A.
Figure 1E:
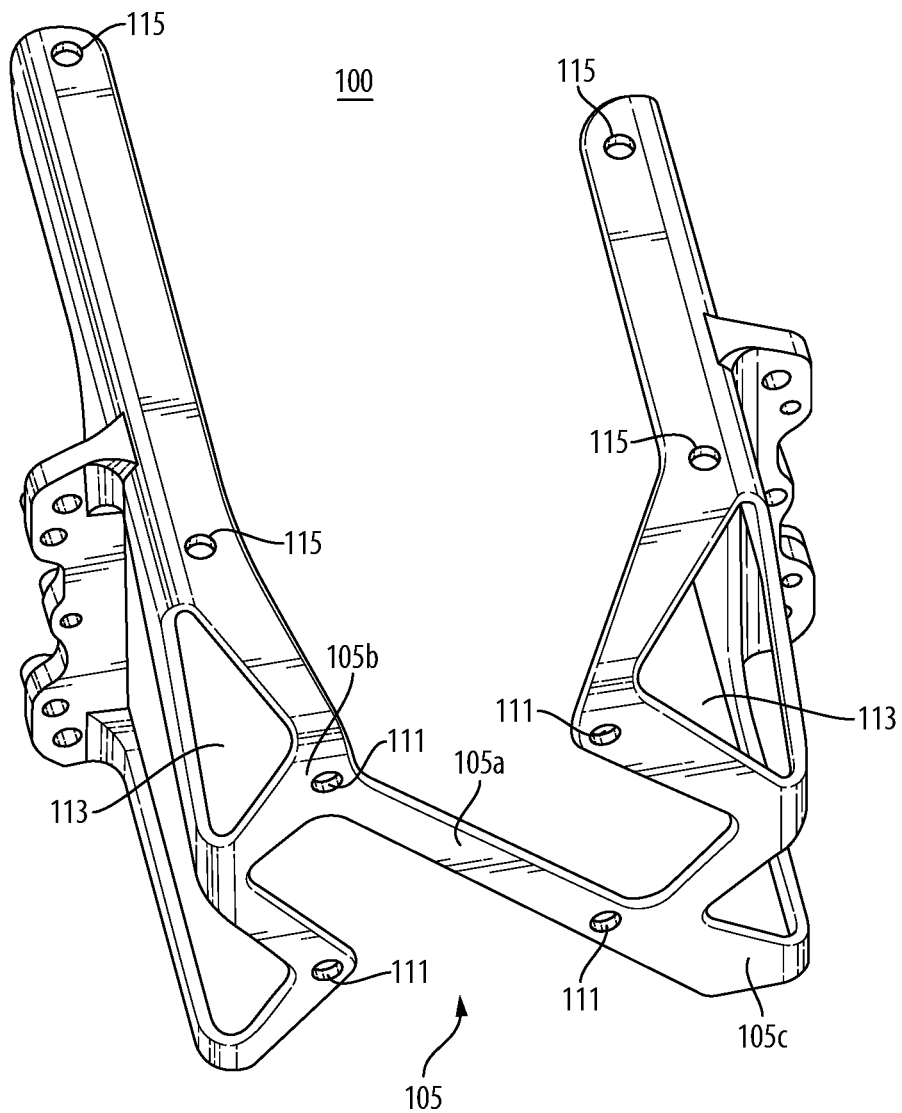
FIG. 1E is a top perspective view of the embodiment of FIG. 1A.
Figure 1F:
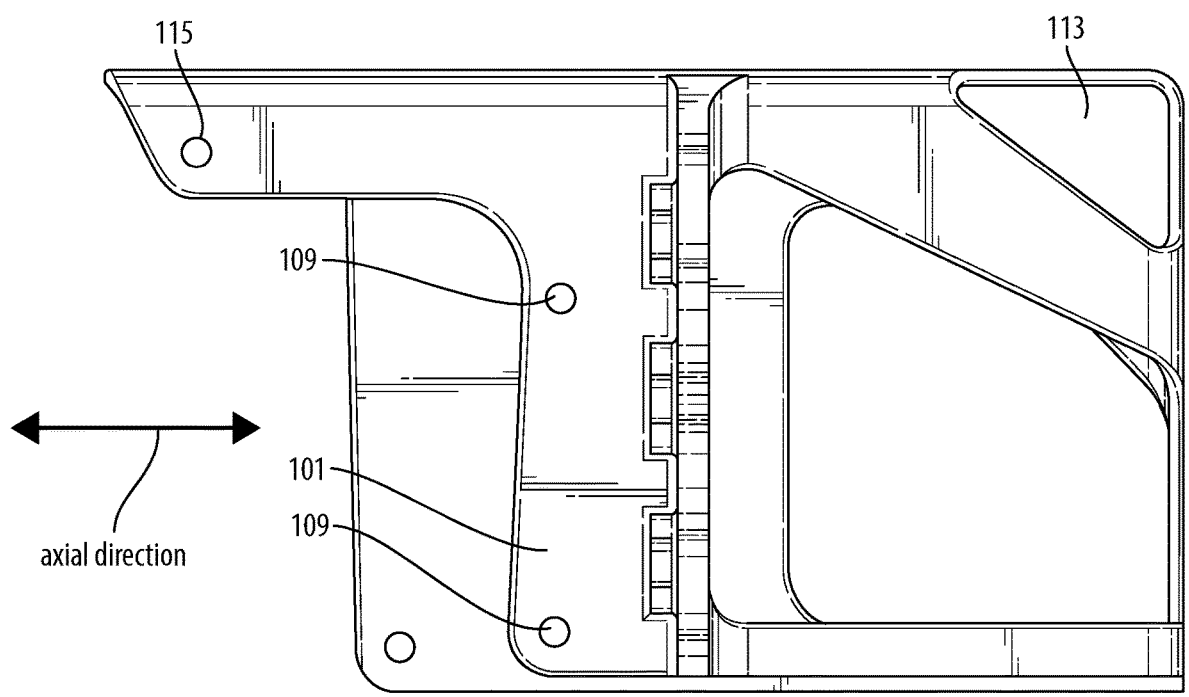
FIG. 1F is a first side elevation view of the embodiment of FIG. 1A.
Figure 1G:
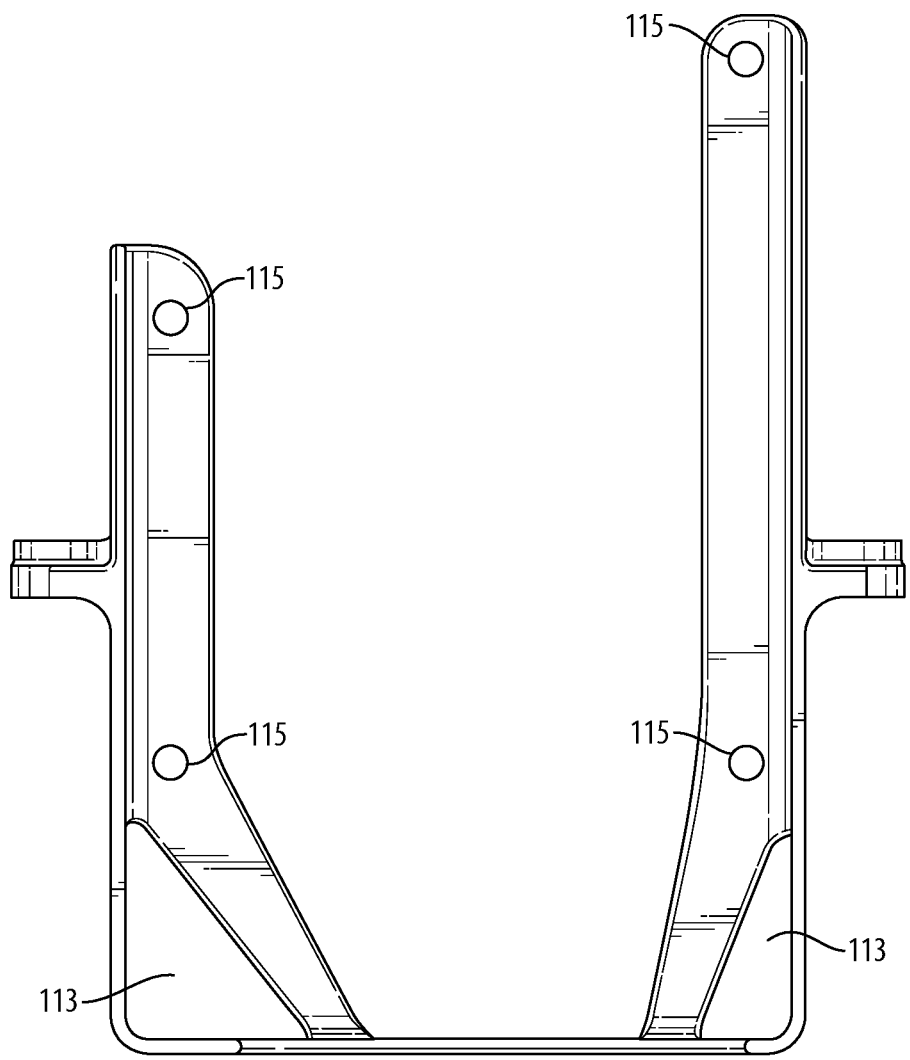
FIG. 1G is a bottom plan view of the embodiment of FIG. 1A.
Figure 1H:
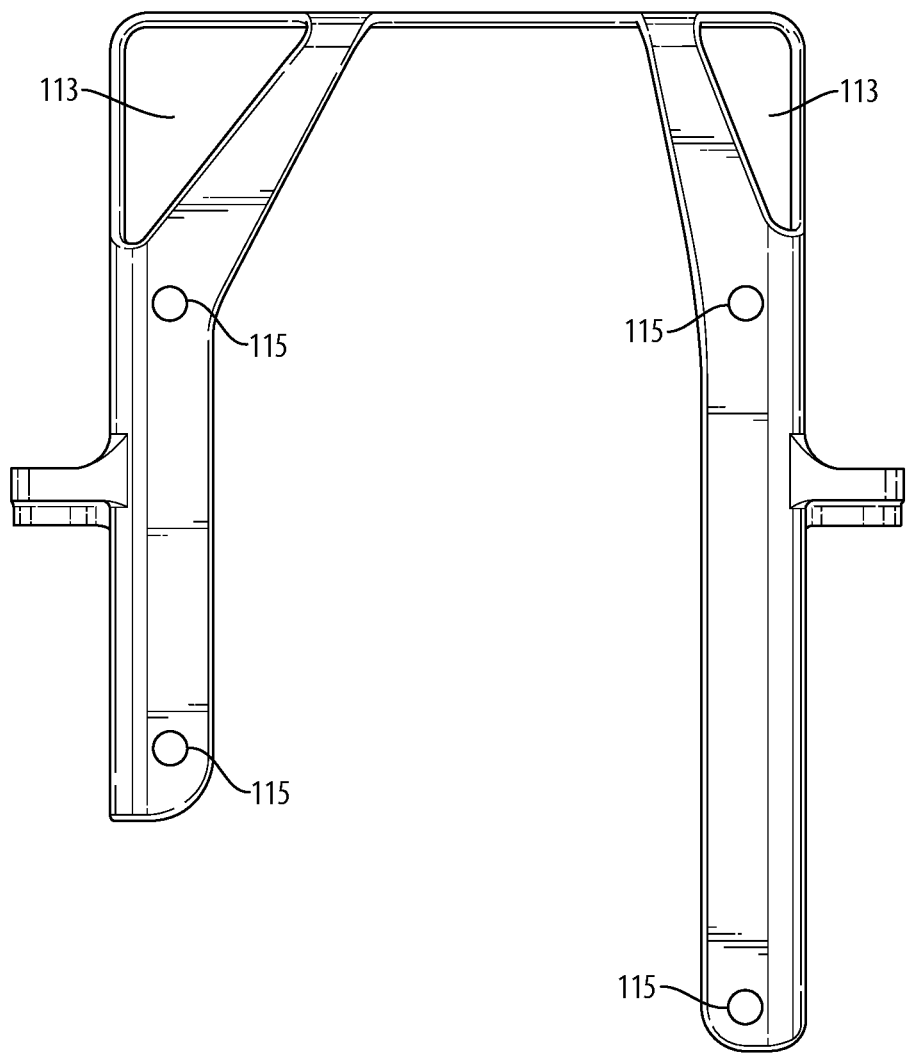
FIG. 1H is a top plan view of the embodiment of FIG. 1A.
Figure 1I:
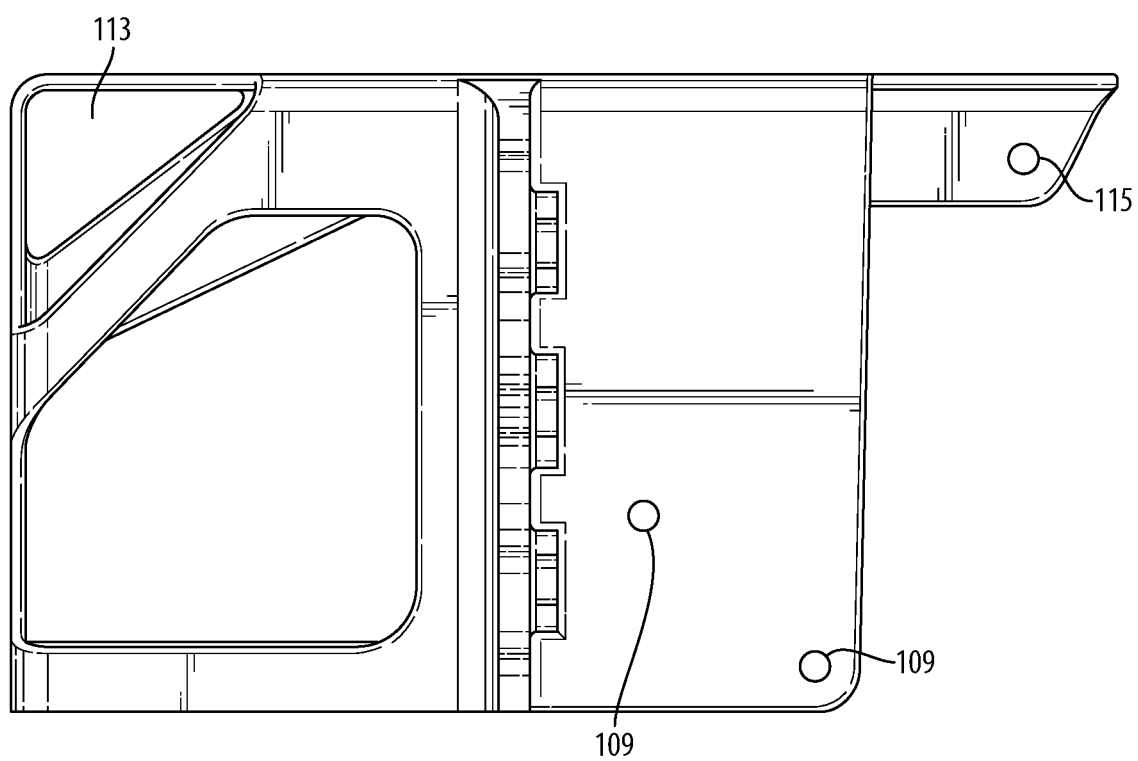
FIG. 1I is a second side elevation view of the embodiment of FIG. 1A.
Figure 2A:
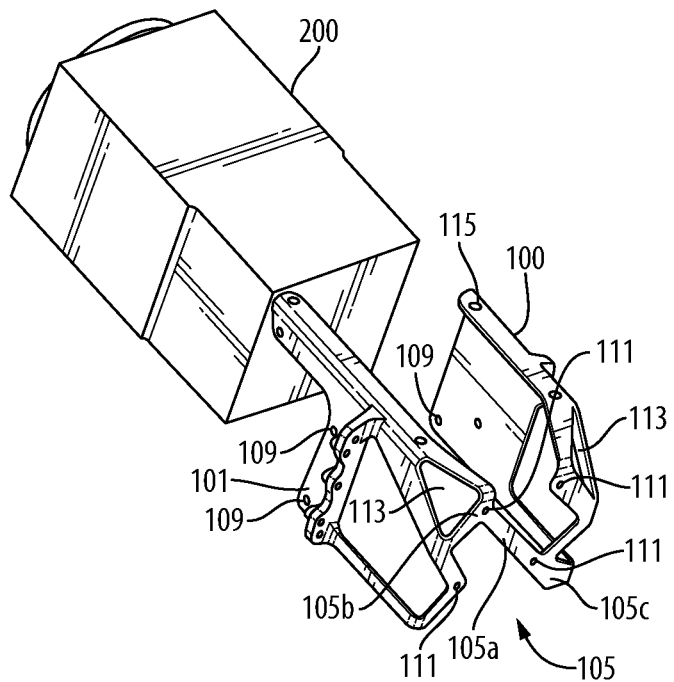
FIG. 2A shows an embodiment of a device being inserted into the embodiment of FIG. 1A.
Figure 2B:
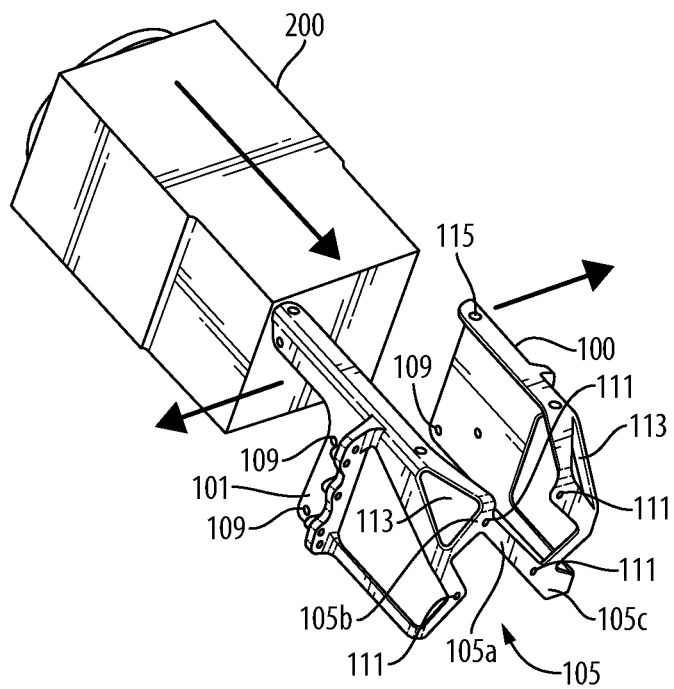
FIG. 2B shows flexing of the embodiment of FIG. 1A to insert the device of FIG. 2A.
Figure 2C:
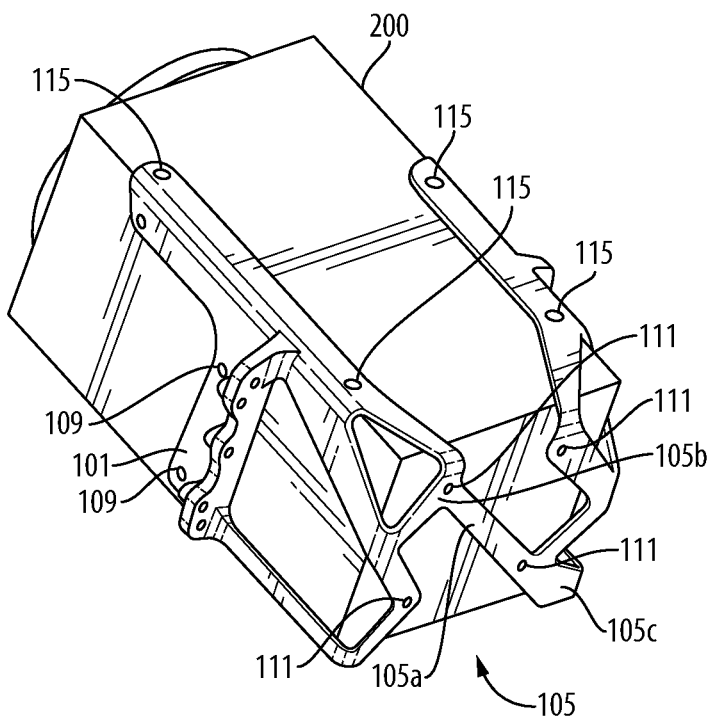
FIG. 2C shows the device inserted into the embodiment of a mount of FIG. 1A.

Referring to FIGS. 1A-1I, a mounting bracket 100 can be configured to receive a device 200 (e.g., as shown in FIG. 2A-2C) to mount the device 200. The mounting bracket 100 can include a first portion 101 extending in an axial direction and configured to mount to a first side of the device 200. The mounting bracket 100 can include a second portion 103 extending in the axial direction and configured to mount to a second side of the device 200.

The mounting bracket 100 can include a crossbar structure 105 connecting the first portion 101 to the second portion 103. The crossbar structure 105 can extend between the first portion and the second portion in a transverse direction to the axial direction. The crossbar structure 105 can be configured to flex to allow the first portion 101 and the second portion 103 to move laterally apart to allow insertion of the device 200 between the first portion 101 and the second portion 103. This can also allow snap fit of the device 200 between the first portion 101 and the second portion 103. The first portion 101 and the second portion 103 can be configured to snap fit around the device 200.

Figure 3:
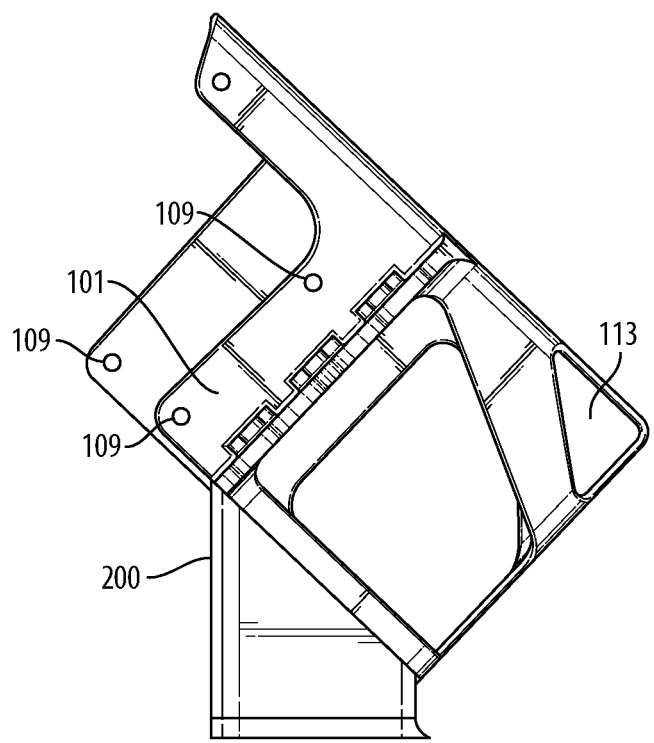
FIG. 3 shows an embodiment of a manufacturing method in accordance with this disclosure.

The crossbar structure 105 can include an angled flex member 105a that extends between and connects to a first corner 105b and a diagonally opposite second corner 105c. The angled flex member 105a can be angled 45 degrees, for example. The angled flex member 105a can act as a leaf spring. With a 45 degree angle, a 45 degree build direction as shown in FIG. 3 allows for a good build quality, for example, in additive manufacturing. The angled flex member 105a can be designed to be as long as possible between PCB holes to maximize flexibility, for example. In certain embodiments, a length to thickness ratio of the angled flex member 105a can be about 30 mm to 1 mm thick (e.g., about 30 to 1).

The crossbar structure 105 can be defined in a crossbar plane (e.g., the plane of FIG. 1B, e.g., defined by x-y axes as shown) perpendicular to the axial direction. The first portion 101 and the second portion 103 can extend approximately 90 degrees from the crossbar plane, for example.

The first portion 101 and second portion 103 can include one or more snap fit features 109 configured to retain the mounting bracket 100 to the device 200 in a snap fit relationship. In certain embodiments, the one or more snap fit features 109 can include one or more holes (e.g., as shown) configured to mate with one or more pins (not shown) on an exterior of the device 200. The one or more snap fit features 109 can be pins, for example, and the housing of the device 200 can include one or more holes.

The crossbar structure 105 can include one or more mounting holes 111 defined therein to receive a circuit board (not shown, e.g., associated with the function of the device 200). In certain embodiments, the crossbar structure 105 is configured to be a backstop for the device 200 (e.g., as shown in FIG. 2C). In certain embodiments, the device 100 can be an imaging device (e.g., a camera).

In certain embodiments, the first portion 101, the second portion 103, and the crossbar structure 105 are a single piece as shown. For example, the mounting bracket 100 can be additively manufactured. In certain embodiments, the first portion 101, the second portion 103, and the crossbar structure 105 form a skeletal body having a plurality of openings 113 configured to minimize weight of the mounting bracket 100, for example. The openings 113 can also enable or improve flexibility of the mounting bracket 100 (e.g., in the x-direction as shown in FIG. 1B).

In accordance with at least one aspect of this disclosure, referring to FIGS. 2A, 2B, and 2C, a method of using the mounting bracket, e.g., bracket 100 as disclosed herein, e.g., as described above, can include outwardly moving the first portion 101 and the second portion 103 causing a flexing of the crossbar structure 105 (e.g., as shown in FIG. 2B) and inserting the device 200 into the mounting bracket 100 while the first portion 101 and the second portion 103 are moved outwardly. The method can include releasing the first portion 101 and the second portion 103 to snap around the device 200. In certain embodiments, releasing the first portion 101 and the second portion 103 includes snap fitting one or more snap fit features 109 of the first portion 101 and the second portion 103 to retain the mounting bracket 100 to the device 200 in a snap fit relationship.

The method can include mounting the first portion 101 and the second portion 103 to the device 200 with one or more fasteners (not shown), e.g., via one or more fastener holes 115. For example, the one or more fasteners can include one or more screws. The method can include attaching a circuit board to the crossbar structure 105.

In accordance with at least one aspect of this disclosure, referring to FIG. 3, a method for manufacturing the mounting bracket, e.g., as disclosed herein, e.g., as described above, can include additively manufacturing the mounting bracket 100. Additively manufacturing can include building the mounting bracket 100 at an angle relative to the axial direction (e.g., as shown in FIG. 3). For example, building the mounting bracket at an angle relative to the axial direction can include building the mounting bracket at a 45 degree angle relative to the axial direction (e.g., shown built on support structure having the axial axis 45 degrees from the build surface.

Embodiments can be configured to snap around a camera housing. For example, the mounting bracket 100 can be flexed outward as shown, snapped to a camera housing, and then bolted to the camera housing to fix the mounting bracket 100 to a camera housing. Embodiments provide a very stiff structure in load directions (e.g., for drone or aircraft mounted cameras) experienced in use supporting the camera, but are also flexible in assembly load directions (e.g., lateral force direction has flexibility without deformation). The structure that allows flexibility can be the structure that is in the vertical plane (a single cross bar that is diagonal and acts as a leaf spring). Embodiments can snap fit to loose fitting pins already on the camera housing.

Embodiments can provide an additive manufacturing (AM) topology optimized unibody camera mounting bracket with a snap fit function, for example. Embodiments can be used to mount a camera in observation housing for a drone. Embodiments can provide mounting flanges for the camera into its upper mounting assembly. Embodiments can also provide mounting locations for the accompanying electronic components for the camera functionality.

Camera brackets using traditional manufacturing processes need to be assembled in multiple small parts in order to be assembled on the camera. This leads to excess weight due to overlapping flanges and loose hardware required to bolt up those flanges. Assembling the cameras in this fashion can be time consuming due to the nature of the small parts. Traditional manufacturing processes such as sheet metal fabrication and machining require excess material for forming to prevent distortion and scrapping parts, leading to excess material in the final design due to manufacturing. Traditional manufacturing processes such as sheet metal fabrication and machining require bolted flanges and overlapping material for assembly.

Embodiments of a bracket can be unified into a single body utilizing topology optimization and A M buildability constraints to dictate the distribution of material around the camera that is needed for the load set the camera experiences. Embodiments of a bracket additionally can be designed to be deflected during assembly to slide the bracket over the camera and then snap onto the locating pins on the camera. This is all done without yielding the part.

Embodiments can provide a 75% manufacturing/assembly time reduction (e.g., 15 min per unit), about a 10% cost reduction (e.g., over $500 per unit), and about 40% or more weight reduction (e.g., over 14 g per unit). Embodiments are useful in aviation and add to longevity, payload ability, and range of drones, for example.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A mounting bracket configured to receive a device to mount the device, comprising:
    a first portion extending in an axial direction and configured to mount to a first side of the device;
    a second portion extending in the axial direction and configured to mount to a second side of the device;
    a crossbar structure connecting the first portion to the second portion, wherein the crossbar structure extends between the first portion and the second portion in a transverse direction to the axial direction, wherein the crossbar structure is configured to flex to allow the first portion and the second portion to move laterally apart to allow insertion of the device between the first portion and the second portion and snap fit of the device between the first portion and the second portion;
    wherein the crossbar structure includes an angled flex member that extends between and connects to a first corner and a diagonally opposite second corner.

2. The mounting bracket of claim 1, wherein the angled flex member is angled 45 degrees.

3. The mounting bracket of claim 1, wherein the crossbar structure is defined in a crossbar plane perpendicular to the axial direction.

4. The mounting bracket of claim 3, wherein the first portion and the second portion extend approximately 90 degrees from the crossbar plane.

5. The mounting bracket of claim 3, wherein the crossbar structure includes one or more mounting holes defined therein to receive a circuit board.

6. The mounting bracket of claim 1, wherein the crossbar structure is configured to be a backstop for the device.

7. The mounting bracket of claim 6, wherein the first portion and second portion include one or more snap fit features configured to retain the mounting bracket to the device in a snap fit relationship.

8. The mounting bracket of claim 7, wherein the one or more snap fit features include one or more holes configured to mate with one or more pins on an exterior of the device.

9. The mounting bracket of claim 1, wherein the device is an imaging device.

10. The mounting bracket of claim 1, wherein the first portion, the second portion, and the crossbar structure are a single piece.

11. The mounting bracket of claim 10, wherein the first portion, the second portion, and the crossbar structure form a skeletal body having a plurality of openings configured to minimize weight.

12. A method of using the mounting bracket of claim 1, comprising:
    outwardly moving the first portion and the second portion causing a flexing of the crossbar structure;
    inserting the device into the mounting bracket while the first portion and the second portion are moved outwardly; and releasing the first portion and the second portion to snap around the device.

13. The method of claim 12, wherein releasing the first portion and the second portion includes snap fitting one or more snap fit features of the first portion and the second portion to retain the mounting bracket to the device in a snap fit relationship.

14. The method of claim 13, further comprising mounting the first portion and the second portion to the device with one or more fasteners.

15. The method of claim 14, wherein the one or more fasteners include one or more screws.

16. The method of claim 15, further comprising attaching a circuit board to the crossbar structure.

17. A method for manufacturing the mounting bracket of claim 1, comprising additively manufacturing the mounting bracket.

18. The method of claim 17, wherein additively manufacturing includes building the mounting bracket at an angle relative to the axial direction.

19. The method of claim 18, wherein building the mounting bracket at an angle relative to the axial direction includes building the mounting bracket at a 45 degree angle relative to the axial direction.

* * * * *